United States Patent [19]

Rozporka

[11] Patent Number: 4,549,669
[45] Date of Patent: Oct. 29, 1985

[54] LATCH FOR VIDEO CASSETTE CONTAINER

[75] Inventor: Richard E. Rozporka, San Mateo, Calif.

[73] Assignee: Tandy Corporation, Fort Worth, Tex.

[21] Appl. No.: 666,405

[22] Filed: Oct. 30, 1984

[51] Int. Cl.⁴ .................. B65D 41/16; B65D 41/18
[52] U.S. Cl. .................................. 220/306; 220/307; 206/387
[58] Field of Search .............. 220/306, 307, 337, 339; 206/387, 306, 305, 304, 303, 444, 493

[56] References Cited

U.S. PATENT DOCUMENTS 3,896,929  7/1975  Mills .................................. 206/387
4,011,940  3/1977  Neal et al. ......................... 206/1.5
4,231,474  11/1980 Takahashi .......................... 220/306

Primary Examiner—George T. Hall
Attorney, Agent, or Firm—Townsend and Townsend

[57] ABSTRACT

A container with a pivotal closure member and latching means for said closure member is disclosed. The latching means includes a female part defining an entry leading to an enlarged area relative to said entry, and a compressible male part sized and shaped to occupy said enlarged area after being compressed through said entry, the female part being mounted on one of said container and closure member, and the male part being mounted on the other of said container and said closure member.

7 Claims, 5 Drawing Figures

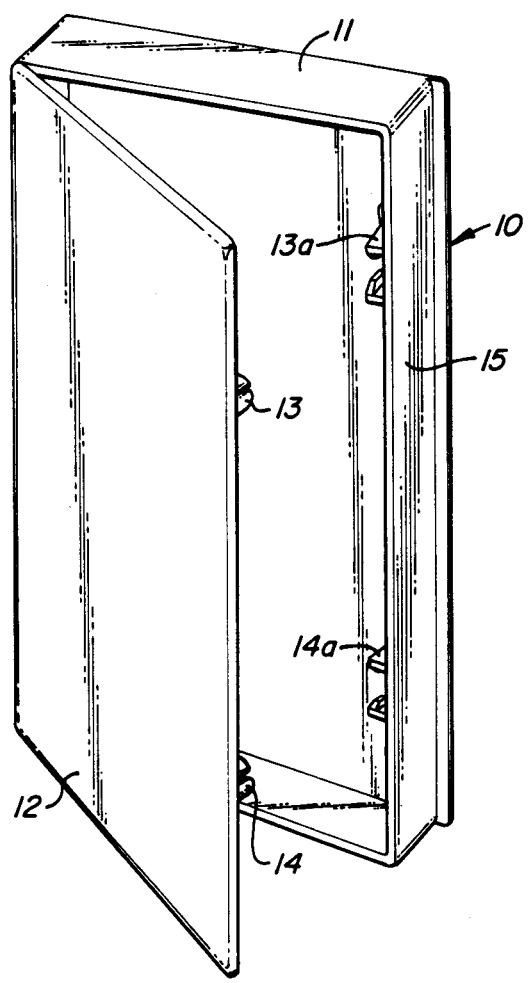
FIG._1.
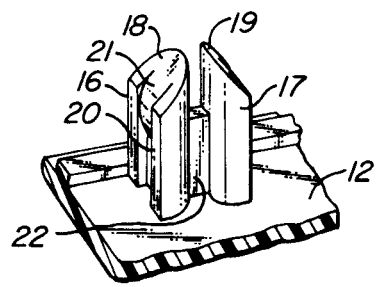
FIG._3A.
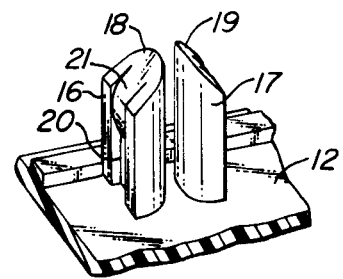
FIG._3B.

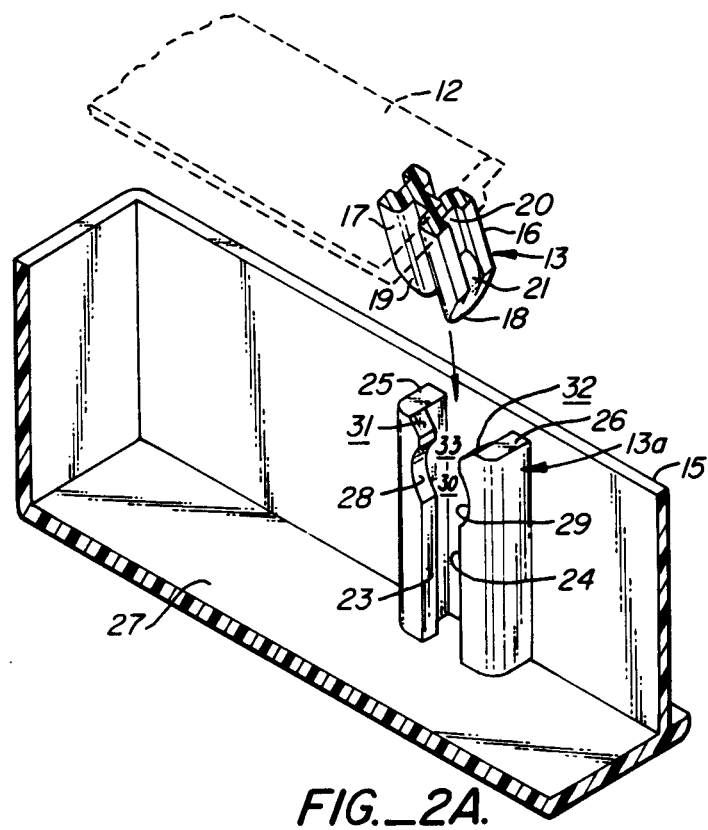
FIG._2A.
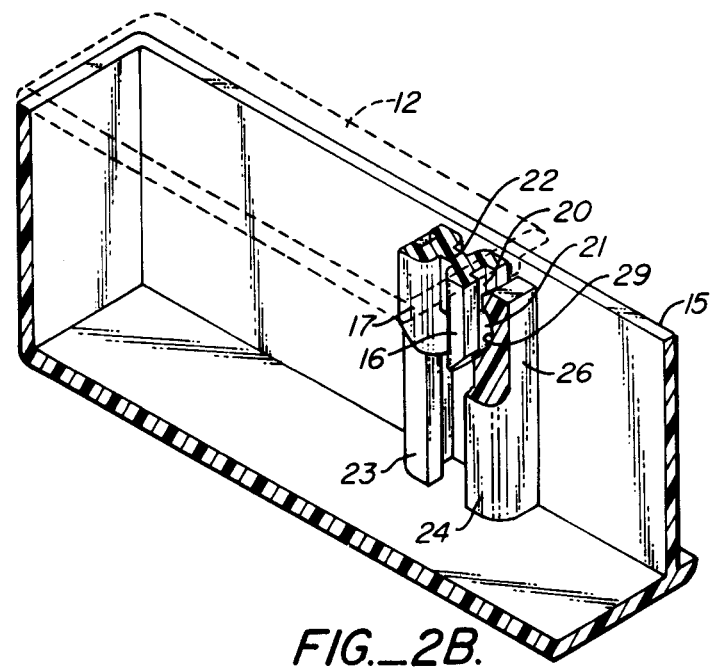
FIG._2B.

1

LATCH FOR VIDEO CASSETTE CONTAINER

BACKGROUND OF THE INVENTION

This invention relates to containers having openable closure members. More particularly, it relates to a latch for securing the closure member in the closed position.

In the preferred embodiment the invention provides a container in the form of an album. The album is a rectangular box with one side hinged for access to the interior of the album. It is contemplated that the album will typically be molded from a suitable plastic, such as polypropylene or other similar resilient material. Containers of this type have previously been made but the latching mechanism for securing the closure side have not been entirely satisfactory. Previous arrangements have been inconsistent in the amount of force required to open and close the latching mechanism. Prior latching mechanisms resulted in a degree of closing dependent upon the amount of force applied. In other words, the more force applied to the closure mechanism, the tighter the closing mechanism was secured. As a result, the amount of force needed for opening the mechanism was also not consistent.

The present invention provides a latching means that can be adjusted to be operative over a wide range of opening and closing forces. Of particular significance, once the amount of force to be applied is selected, the latch will operate consistently with that same amount of force. Moreover, the present invention provides a latch with a definite and positive feel for the user at the selected pressure and this is accomplished with a "snap-on" feeling for the user.

SUMMARY OF THE INVENTION

In accordance with the present invention there is provided a container with a pivotal closure member and latching means for said closure member. The latching means includes a female part defining an entry leading to an enlarged area relative to said entry, and a compressible male part sized and shaped to occupy said enlarged area after being compressed through said entry, the female part being mounted on one of said container and closure member, and the male part being mounted on the other of said container and said closure member.

In the preferred embodiment the enlarged area of the female part is defined by a pair of concave arcuate surfaces. Further, the male part is formed from a pair of spaced apart parallel elongate members defining thereon a pair of convex surfaces, said spacing permitting compression of the elongate members towards each other to permit passage through said entry.

Another optional unique feature of the invention is a bridge joining the male elongate members to restrict compression of the elongate members. The size of the bridge can be varied and in doing so the degree of flexibility and compressibility of the elongate members is controlled. In this way the latching mechanism is designed to be operative over a wide range of open/closing forces and the desired force for a particular application can be selected.

BRIEF DESCRIPTION OF THE DRAWINGS

FIG. 1 is a perspective view of an album utilizing the latching mechanism of the present invention.

FIG. 2A is a section of the album of FIG. 1 showing the female portion of one of the latches within the album and its corresponding male portion, the latch being in the open position.

FIG. 2B is the same view as FIG. 2A but with the male and female portions of the latch in the closed position.

FIG. 3A is a section of the hinged side of the album of FIG. 1 showing the male portion of the latch mechanism mounted thereon and including a fully extended bridge joining the two legs of the male portion of the latch.

FIG. 3B is a view similar to FIG. 3A, except that there is no bridge present joining the legs of the male portion of the latch.

DETAILED DESCRIPTION OF THE PREFERRED EMBODIMENT

With reference to FIG. 1, there is shown generally at 10 an album suitable for a cassette such as those commonly used in home video recorders. Album 10 is typically made by molding a suitable plastic and has a rectangular box portion 11 and a hinged side 12 which may be opened and closed to provide access to the interior of box 11. Side 12 is pivotally attached to box 11 during the molding process in which the plastic material used in forming side 12 and box 11 also forms a flexible joint between these two elements to serve as a hinge. Side 12 is secured in a closed position on box 11 by means of the latch mechanism of this invention.

The general position of the latch may be seen in FIG. 1 wherein a pair of male parts 13 and 14 are mounted on side 12 and a cooperating pair of female parts 13a and 14a are mounted on end 15 of box 11. With reference to FIGS. 3A and 3B, each male part includes two spaced apart flexible legs 16 and 17. Flexibility may conveniently be obtained by forming the male parts from the same resilient plastic such as polypropylene used in making the album 10. Each of legs 16 and 17 has a sloped leading edge 18 and 19, respectively, which provides an outwardly decreasing cross-sectional area. As will be explained hereinafter, such a configuration facilitates frictional insertion of the male part into the female part of the latching mechanism. Each of legs 16 and 17 further define channels such as channel 20 on leg 16 along its length for engagement with cooperating surfaces of the female part described hereinafter. Located adjacent the sloped leading edges 18 and 19 of legs 16 and 17 is an arcuate convex area such as area 21 on leg 16.

Legs 16 and 17 are flexible and can be compressed towards each other upon application of appropriate force. The extent of compressibility may be preselected by the inclusion of solid bridge 22 which joins legs 16 and 17. Arcuate convex area 21 is generally situated at one end of legs 16 and 17 adjacent the sloped leading edges 18 and 19 and bridge 22 is adjacent the other end of legs 16 and 17 and extends along the legs therefrom. The choice of length of extension of bridge 22 controls extent of compressibility of legs 16 and 17, which in turn will determine the amount of force needed to open and close the latching mechanism.

In the embodiment shown in FIG. 3A bridge 22 extends from side or cover 12 along legs 16 and 17 to a point adjacent arcuate area 21. In such a configuration compressibility of legs 16 and 17 is highly restricted and a maximum force is required to open and close the latch mechanism. In contrast, FIG. 3B illustrates an embodiment wherein there is no bridge at all joining legs 16 and 17. In the embodiment of FIG. 3B the minimum amount of force for the particular structure will be required to open and close the latching mechanism. Bridge sizes between that shown in FIGS. 3A and 3B will provide a variation in the force required to open and close the latch.

FIG. 2A provides a good view of the female part of the latching means of this invention. As there shown, female part 13a includes a pair of spaced apart rails 23, 24 extending at right angles from their respective base portions 25, 26. Base portions 25, 26 are fixedly mounted on end 15 of box 10 and bottom 27 of box 10. Rail 23 defines an arcuate concavity 28 therein. Similarly, rail 24 defines arcuate concavity 29 therein, with arcuate concavities 28 and 29 mutually facing each other. Female member 13a thus defines a relatively narrower entry area 33 between rails 23 and 24 leading to enlarged area 30 between arcuate concavities 28 and 29.

To secure side 12 in a closed position the male and female parts of the latching means are brought together in the direction of the arrow shown in FIG. 2A to the latched position as best seen in FIG. 2B. To arrive at the relationship of FIG. 2B male part 13 is brought so that leading edges 18 and 19 (and the relatively smaller cross-section they present) can begin to enter the relative narrower entry 33 of female part 13a. Application of force on side 12 will urge legs 16 and 17 downwardly so that the legs 16 and 17 will be compressed as sloped leading edges 18 and 19 of legs 16 and 17 progressively bear upon sloped leading edges 31 and 32 of rails 23 and 24. This compression allows passage of convex areas such as area 21 past entry 29 and into concavities 28 and 29. When the convex areas such as area 21 are concentric with concave area 29, compressive forces are released and the latch is in the locked position of FIG. 2B. As the convex area 21 enters concave area 29 the snap-on feeling referred to earlier is apparent to the user.

Guidance of male part 13 into female part 13a is obtained in part by the cooperative engagement of channels such as channel 20 of leg 16 with rail 24 of female part 13a. A similar relationship exists between leg 17 and its corresponding channel and rail 23.

The structure and function of male part 14 and female part 14a shown in FIG. 1 are in all respects the same as that described with respect to male part 13 and female part 13a.

What is claimed is:

1. In a container with a pivotal closure member, latching means for said closure member comprising: a female part defining an entry leading to an enlarged area relative to said entry, said enlarged area being defined by a pair of opposed concave arcuate surfaces, and a compressible male part sized and shaped to occupy said enlarged area after being compressed through said entry, said male part being formed from a pair of spaced apart parallel elongate members defining thereon a pair of convex surfaces, said spacing permitting compression of the elongate members towards each other to permit passage through said entry, said female part being mounted on one of said container and closure member, and said male part being mounted on the other of said container and said closure member.

2. A container and closure member in accordance with claim 1, and including a bridge joining said elongate members to restrict compression thereof.

3. A container and closure member in accordance with claim 2, wherein said convex surfaces are adjacent one end of said elongate members, and said bridge joining said elongate members is adjacent the other ends and extends therefrom between said members, the extent of said bridge controlling the degree of flexibility of said elongate members.

4. An album for a tape cassette comprising: a rectangular box having one hinged side, a pair of female latching members mounted on said box, each of said female members formed from two spaced apart rails having mutually facing arcuate concavities therein, and a pair of male latching members mounted on said hinged side for cooperation with said female latching members, each of said male members being formed from two spaced apart flexible legs sized for frictional insertion between the spaced apart rails of said female members, said legs defining arcuate convex areas for substantially occupying the arcuate concavities of said female members.

5. An album for a tape cassette in accordance with claim 4, wherein the legs of said male members have sloped leading edges to facilitate frictional insertion between the rails of said female members, each of said legs defining a channel therealong for engagement with said rails.

6. An album for a tape cassette in accordance with claim 4, wherein the legs of said male latching members are spaced apart a sufficient distance to require compression towards each other to permit insertion between the rails of said female members.

7. An album for a tape cassette in accordance with claim 6, and including a solid bridge between said legs to restrict the extent of compressibility of said legs.

* * * * *